Patented Dec. 8, 1936

2,063,322

UNITED STATES PATENT OFFICE 2,063,322

SEPARATION OF AN ORGANIC ACID ESTER FROM ITS REACTION MIXTURE

Carl J. Malm and Charles R. Fordyce, Rochester, N. Y., assignors, by mesne assignments, to Eastman Kodak Company, Jersey City, N. J., a corporation of New Jersey No Drawing. Application March 23, 1934, Serial No. 717,083

1 Claim. (Cl. 260—102)

The present invention relates to the separation of a cellulose ester containing acyl groups from its solution in the acylation bath which comprises subjecting the mass in anhydrous condition to the action of a high boiling liquid aliphatic hydrocarbon.

Heretofore in the preparation of a cellulose ester, after the esterification and any other treatment such as hydrolysis, that ester has been separated from the liquid in which it was dissolved by pouring the mass into a liquid which precipitates the cellulose ester. Some of the liquids which have been suggested for use as precipitants are water, methyl alcohol, carbon tetrachloride, benzene, ethyl ether and low-boiling petroleum hydrocarbons (B. P. 30–70°).

These precipitants although effective for the precipitation of the ester itself exhibited in practical use various accompanying disadvantages among them being losses in handling due to the low boiling point of some of the precipitants, a low flash point which in the case of the more inflammable liquids makes handling not only wasteful but dangerous and the difficulty of recovering the excess of the esterification ingredients, over that necessary for the esterification from the filtrate resulting from the precipitation. Fractional distillation of the liquid remaining after the precipitation to separate the ingredients thereof has been suggested, however as a rule with this method the separation of the ingredients is not sharp, especially where there are a large group of different liquids together in one mixture such as results from the precipitation of a cellulose ester from its reaction mixture.

One object of our invention is to provide a process for the separation of a cellulose ester from its esterification bath in which the recovery of the valuable ingredients of the spent esterification liquor is facilitated. Another object of our invention is to provide a process especially adapted to the separation of the mixed esters of cellulose, which exhibit the desired solubilities without the necessity of hydrolysis, from their reaction mixture. Other objects will appear herein.

We have found that if an anhydrous solution of a cellulose ester is mixed with an aliphatic liquid hydrocarbon boiling within the range 150°–300° C. and preferably within the range 150°–200° C. (not over 5% of the hydrocarbon should boil below 150° C.) the ester will be precipitated out from the solution, substantially quantitatively. We have found that the filtrate consists of a liquid the ingredients of which are readily recoverable by decantation or distillation or both. It is preferable in carrying out a precipitation in accordance with the present invention to first neutralize the mineral acid catalyst which may be present.

The precipitation in accordance with the present invention is carried out preferably by passing the solution of the cellulose ester into the liquid hydrocarbon in the form of a fine stream or spray, accompanied by agitation or stirring of the precipitation liquid. The ester may then be separated from the mass and the resulting liquid is of a composition which allows of easy recovery of the valuable ingredients therein. This separation may be carried out by adding a small amount of water, such as about 10%, to the liquid, whereupon separation into two layers occurs. If a low-boiling aliphatic hydrocarbon is used this separation of layers may not occur as that hydrocarbon is more compatible with aqueous acetic acid.

If the ester of butyric acid or a higher fatty acid is prepared the upper layer which will form upon the addition of water will consist essentially of the liquid hydrocarbon and the butyric or higher fatty acid while the lower layer will comprise mainly water and any lower fatty acid such as acetic which may be present, however, a very small amount of the hydrocarbon might be present in the lower layer.

If only acetic or propionic acids are present the upper layer formed upon addition of water will comprise mainly the hydrocarbon with possibly small amounts of organic acid and water. The lower layer comprises mainly organic acid together with small amounts of water and hydrocarbon.

It has been found that the type of hydrocarbon employed as a precipitant in the present invention forms an azeotropic mixture with water so that the organic acid in each layer, may be separated from the hydrocarbon and water by means of an azeotropic distillation.

In some cases the simple ester of a higher acid such as butyric made be made using butyric or another higher fatty acid anhydride however before the precipitation a lower acid such as acetic might be added to the completed esterification mass to render it more flowable before precipitation, the butyric and acetic acids will be separated upon the addition of water to the filtrate as indicated.

Although any of the liquid petroleum hydrocarbons boiling within the range specified may be employed as the precipitant in accordance with our invention, the use of that liquid known as Stoddard solvent is preferred. The specifications of this hydrocarbon liquid are given in the Bureau of Standards bulletin #CS 3-28. As a rule the liquid hydrocarbons which exhibit the qualities prescribed for a precipitant in accordance with our invention are petroleum distillates.

Although the present invention was primarily intended to be applied to the precipitation of the mixed esters which do not require hydrolysis to assure the customary solubilities for commercial use, such as cellulose acetate propionate and cellulose acetate butyrate, it is also applicable to the separation of other esters both simple and mixed from their reaction mixtures. For instance, a cellulose acetate, a cellulose propionate or a cellulose butyrate, may be separated from their respective esterification baths by the present invention if the ester has not been subjected to hydrolysis. Even if the ester has been subject to a hydrolysis treatment the solution containing the ester may be rendered anhydrous by destroying the water present with acetic anhydride. Obviously in the case of a hydrolyzed ester where it is necessary to destroy considerable water such procedure would probably be uneconomical, however, where the hydrolysis is carried out in a bath containing very little water, the amount of acetic anhydride necessary to render the bath anhydrous would be quite small.

If a higher fatty acid ester of cellulose, such as of a fatty acid having 4 or more carbon atoms, is prepared in which chloracetic or an alkoxyacetic anhydride is employed as an impeller together with the appropriate acid, the chloracetic or alkoxyacetic acid formed from the anhydride employed in the esterification can be recovered from the spent liquor after precipitation in the same way as the acetic acid is recovered from the spent esterification liquor from the preparation of cellulose acetate-butyrate or of a cellulose ester containing acyl groups having more than 4 carbon atoms. The higher fatty acid on the other hand will be dissolved in the hydrocarbon layer and can be removed therefrom by distillation.

The following examples illustrate specific embodiments of our invention:

Example I

A cellulose acetate propionate was prepared by pretreatment of 50 parts of cotton linters with 350 parts of propionic acid followed by esterification with 150 parts of 85% acetic anhydride containing 0.9 parts of sulfuric acid.

The solution from the above esterification was diluted with 200 parts of acetic acid and was slowly poured in a fine stream into a mixture of 2800 parts of a petroleum distillate (B. P. 150°-200° C.), 700 parts of acetic acid and 700 parts of propionic acid, accompanied by vigorous stirring of the precipitation mixture. The stirring was continued for about one-half hour after all of the reaction mixture had been added to the precipitation bath. The precipitation product was then filtered off from the liquid, was washed with further amounts of the petroleum distillate until it was free from acids and was then dried.

The filtrate contains the pretroleum distillate, acetic and propionic acids with perhaps a very small amount of acetic anhydride. By adding a small amount of water (about 10%) to this filtrate a separation into two layers occurs, the upper layer being substantially the petroleum distillate and the lower layer being substantially the organic acids together with a small amount of water. These layers may be further refined as described above.

Example II

A cellulose acetate butyrate was prepared by pretreatment of 50 parts of cotton linters with a mixture of 175 parts of butyric acid and 175 parts of acetic acid, followed by esterification with 150 parts of 85% acetic anhydride containing 0.9 parts of sulfuric acid.

The resulting solution was diluted with 300 parts of acetic acid and was poured slowly in the form of a fine stream into a mixture of 2800 parts of a petroleum distillate (B. P. 150°-200° C.) and 1400 parts of acetic acid accompanied by vigorous stirring to keep the solution uniform and to prevent the precipitated ester from settling too rapidly to the bottom of the container. Stirring was continued for one half hour after the reaction mixture had all been added to the precipitation bath. The ester was then filtered off, washed free from acid with more liquid hydrocarbon and dried.

The filtrate contains petroleum distillate, acetic acid and butyric acid. To recover these ingredients, it may be mixed with water to separate it into two layers as described above.

The upper layer contains mainly petroleum distillate and butyric acid together with a small amount of moisture. The lower layer contains largely acetic acid and water with a small amount of the petroleum distillate. Each of these layers may be separately further treated to recover the constituents by means of azeotropic distillation.

Example III

A cellulose acetate was prepared by pretreating 50 parts of cotton linters with 350 parts of acetic acid and .9 part of sulfuric acid, followed by esterification with 150 parts of 85% acetic anhydride. The reaction mixture containing the cellulose acetate formed in solution was diluted with 200 parts of acetic acid containing enough sodium acetate to neutralize the sulfuric acid present and was poured in the form of a fine stream into a mixture of 2800 parts of a petroleum distillate (B. P. 150°-200° C.) and 1400 parts of acetic acid. The precipitation liquid was stirred throughout the addition of this solution and for about 15 minutes after all of the reaction mixture had been added. The precipitate obtained was then separated from the liquid by filtration, washed with further amounts of the petroleum distillate until free from acids and then dried.

It is to be understood that much of the detail in the above examples, such as the agitation of the precipitation bath, the mixing of some organic acid with the precipitant, etc., is merely to be regarded as good practice and for the purpose of illustrating our invention in processes which we have found are practically successful and give a product which is readily susceptible to subsequent treatments such as washing, drying, dissolving, etc. Our invention broadly comprises the separation of a cellulose ester containing acyl groups from a liquid such as an esterification mixture in which it is dissolved by mixing a liquid aliphatic hydrocarbon, boiling substantially within the range of 150°-300° C., therewith in sufficient amount to precipitate the ester from its solution. The scope of our invention is determined by the claims appended thereto.

In a precipitation process in accordance with our invention it is usually desirable to neutralize the sulfuric acid or other acid catalyst used such as by the addition of sodium acetate, sodium hydroxide or a sodium carbonate, although this neutralization may be omitted especially where only a small amount of catalyst is employed or where the various constituents are to be reused in a cellulose esterification process.

Although a refined hydrocarbon, such as Stoddard solvent, for which the Bureau of Standards has laid down definite specifications is preferred for use as a precipitant in the present invention, other aliphatic hydrocarbons boiling substantially within the range specified, for instance, ordinary kerosene, may be employed as the precipitant.

We claim as our invention:

A method of separating and recovering an organic acid ester of cellulose and lower fatty acid from the solution of the ester in its esterification mixture containing a large proportion of lower fatty acid, the whole being substantially anhydrous, which comprises neutralizing any mineral acid present therein, passing the solution in the form of a fine stream into a precipitating liquid essentially consisting of a liquid aliphatic hydrocarbon substantially boiling within the range 150°–200° C., and removing the ester from the liquid.

CARL J. MALM.
CHARLES R. FORDYCE.